Jan. 27, 1931.  A. S. HUGHES ET AL  1,790,380
DUMPING TRUCK
Filed Oct. 14, 1927
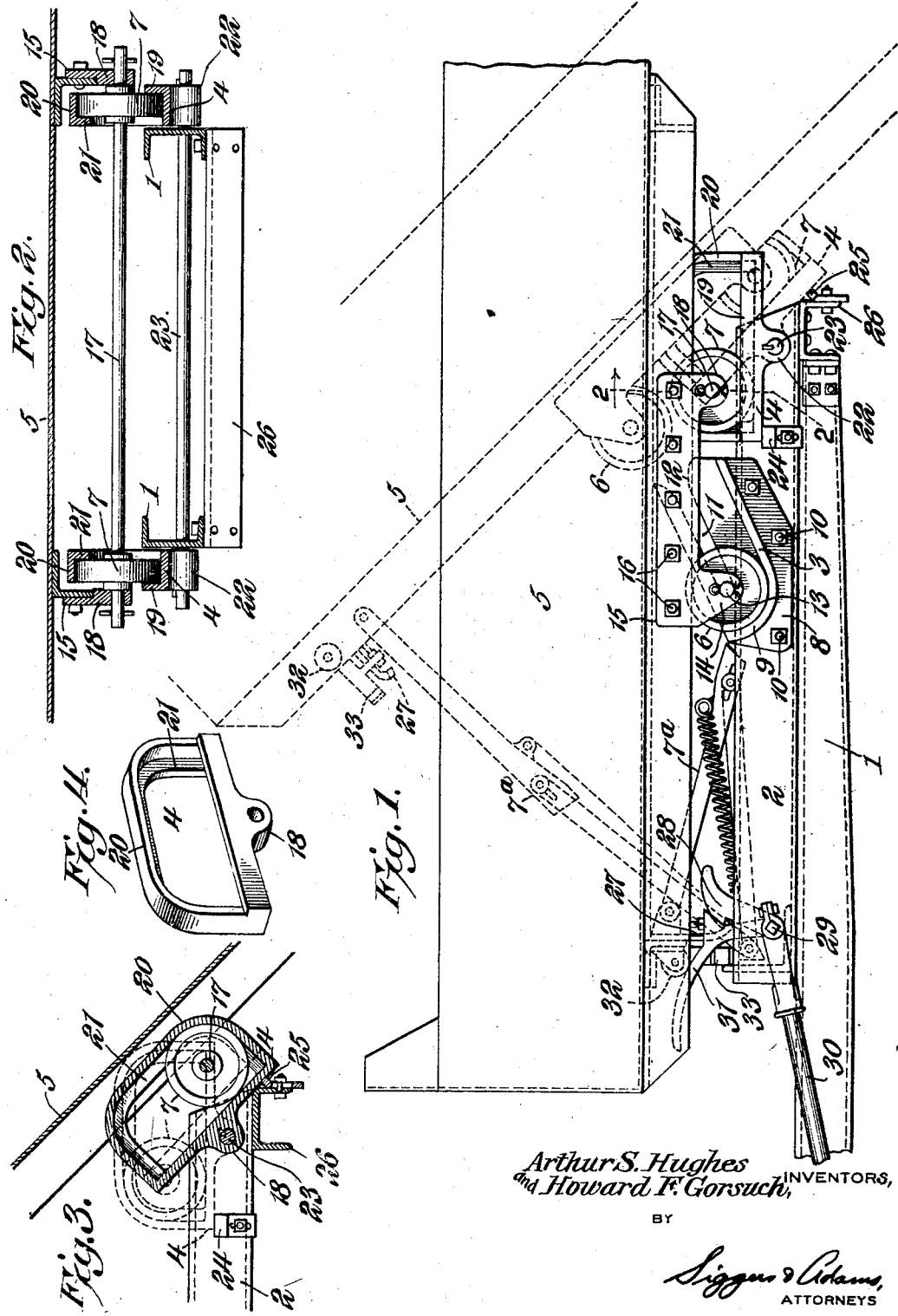
Arthur S. Hughes
and Howard F. Gorsuch, INVENTORS,
BY
*Siggers & Adams,*
ATTORNEYS Patented Jan. 27, 1931

1,790,380

UNITED STATES PATENT OFFICE

ARTHUR S. HUGHES AND HOWARD F. GORSUCH, OF MANSFIELD, OHIO, ASSIGNORS TO THE HUGHES-KEENAN COMPANY, OF MANSFIELD, OHIO, A CORPORATION OF OHIO

DUMPING TRUCK

Application filed October 14, 1927. Serial No. 226,146.

This invention relates to dumping trucks and among other objects aims to provide a mounting for a tilting dump body which permits the body, during dumping, to move longitudinally, ending up with a sudden jar to shake or jolt the load loose from the body.

The present application for patent is a companion to two other applications filed by us, Serial Nos. 215,714 and 232,385.

In the accompanying drawings showing a preferred embodiment of the invention:

Fig. 1 is a side elevation of the rear portion of a truck chassis having the improved runways mounted thereon and showing a dump body;

Fig. 2 is a vertical, transverse section taken on the line 2—2 of Fig. 1;

Fig. 3 is a detail, longitudinal section through one of the tiltable rear tracks or runways; and Fig. 4 is a detail perspective view of one of the tiltable tracks.

When dump trucks are used in road building and similar operations, the truck load is often shovelled into the body, and it is therefore desirable to have the sides of the body as low as possible; but to provide a body capacity sufficiently large to make use of the body commercially profitable, it is necessary to elongate the body, and utilize as much as possible of the bearing capacity of the truck chassis. In order to provide for the easy, automatic dumping of such an elongated body, the truck may have specially designed tracks or runways which permit the loaded body, actuated by the load, to move in a rearward direction upon release of the body, and at the same time to tilt automatically and discharge the load well over the end of the truck chassis and rear wheels. Our copending application, Ser. No. 215,714, claims more broadly such a body mounting. It is desirable, during dumping, to impart a final jolt or jar to dislodge all the contents particularly from the bottom of the body; and the present application covers more particularly a body mounting of the described type which imparts a final jar to the body after longitudinal and tilting movements thereof for dumping.

Referring particularly to the drawings, there is shown a portion of the rear end of a chassis frame 1 of any ordinary truck structure, the wheels and other parts being omitted from the drawing. Mounted upon the rear end of the chassis is a sub-frame 2, preferably formed of angle iron and comprising side bars joined at their front ends by a cross bar and rigidly held upon the chassis in any desired manner.

At substantially midway the length of the side bars of the sub-frame, there is secured a pair of upwardly and rearwardly extending inclined tracks or runways 3, while at the extreme rear end of the said sub-frame there is secured a pair of simultaneously rockable tracks or runways 4, the two pairs of tracks or runways providing supports for the body. Mounted at each side and below the bottom of the dump body 5, there is a pair of wheels or rollers 6 located substantially midway between the front and rear ends of the said body, said wheels or rollers 6 being adapted to traverse the inclined tracks 3 and automatically to elevate the body into dumping position (as shown in dotted lines in Fig. 1) when said body is released for the purpose. The body member 5 also carries a pair of rear wheels or rollers 7, the axes of which are below the bottom of the body, though somewhat elevated above the axes of the front rollers 6, and said rear rollers are adapted to cooperate with the rockable tracks of runways 4 in a manner to permit the sudden dropping of the rear end of the body after said rear rollers have passed over the axis of rotation of the rockable runways.

In order to maintain the dump body in dumping position long enough to discharge the load completely, after the aforesaid jarring action has taken place, and in order to enable the operator to move the truck forwardly to clear the lower end of the body from the discharged load, a "stiff leg" 7ª is employed, such as is shown and described in a copending application recently filed by us, Ser. No. 218,034. This "stiff leg" comprises hinged members which unfold as the body 5 tilts and form a rigid structure in the nature of a toggle to prevent the return of the body until said "stiff leg" is manually operated or "broken" to permit the body to fall to normal loading or carrying position.

When the body 5 is in normal position, the shovellers or loading scoop place the load therein with the greater part of the weight toward the rear of the body thus locating the center of gravity of the loaded body well to the rear of the central rollers 6 and in most instances, slightly to the rear of the rear rollers 7. The body, which is held down in normal position by means to be described, has a tendency to rock to the rear by reason of the placement of the load. When the said holding means is released, the body immediately begins to tilt rearwardly and to move bodily in a rearward direction upon the tracks 3 and 4. The tracks 4 are held (by means to be described) in a rigid, horizontal position until the rear rollers pass over the central part of said tracks, when the tracks simultaneously rock about their own axes, as indicated in dotted lines in Fig. 1, permitting the rear end of the body to fall several inches, coming suddenly to a stop, thus jarring the load loose. During dumping, the front rollers travel upwardly upon the front tracks and finally, as the rear tracks tilt, they leave the front tracks, and move clear of them to the dotted line position of Fig. 1.

In order to secure the front tracks rigidly in position upon the sub-frame, they are preferably formed of suitable castings having vertically disposed base plates 8 extending upwardly above the sub-frame to form side walls or abutting plates for the inner sides of the rollers 6. The tracks or runways 3 are also provided at their front, lower ends with integrally formed rounded stops 9 shaped for engagement by the rollers 6 to prevent forward movement of the body beyond a point where the aforesaid latching mechanism may automatically engage to lock the body in normal position.

The base plate 8 is preferably attached to the sub-frame by bolts 10 and said plate is further provided with an inclined slot 11 located above and conforming with the inclination of the track 3, said slot terminating in a flaring, open mouth 12 at its rear, upper end (as indicated in dotted lines in Fig. 1). The front axle may freely leave its engagement with the slots 11 through the opening 12, when the body assumes its extreme dumping position and, also, the said axle may readily enter the slot when the empty body, through the superior weight of the front end portion thereof, rocks forwardly to assume normal position. The slot 11 is adapted to be traversed by a transverse shaft or axle 13 connecting the front wheels or rollers 6 together, thus providing a rail or keeper over the axle to hold the rollers 6 on the inclined runways 3. The axle 13 is preferably mounted in bearings formed in depending front portions 14 of elongated attaching plates 15 adapted to be attached by bolts 16 to the outer sides of the longitudinal frame members of the body 5.

The rear rollers 7 preferably are likewise mounted on a continuous, transverse shaft or axle 18 having bearings in rear, depending portions 18 of the plate or casting 15; but the rear rollers are continuously housed within their runways 4 and never leave them. The rockable runways 4 are each normally horizontal and are provided along their outer edges with a guard flange 19 to prevent outward movement of the rollers thereon and are further provided with a loop-shaped guard rail or keeper 20 extending upwardly from each end thereof, said upward extensions being adapted to arrest the roller in its forward and rearward movements respectively and being joined at their upper ends by rounded portions of an upper rail or keeper forming part of the rail 20 and serving to hold the rear wheels onto the tracks 4. Each keeper is provided with a continuous flange 21 to bear against the inner face of the roller 7. It will be observed that the front wheels or rollers are also held to the tracks 3 by reason of the axle 13 passing through the slots 11 at either side of the body to prevent jolting or dislodgment of the body from its rigid, substantial support when the truck is traveling.

The weight of the load between the rear axle 17 and the rear end of the body has a constant tendency to rock the body. Thus, when the body is released, and the operator manually operates an initial "kicker" (described in a co-pending application), the relatively short movement of the rollers 7, before reaching the axis of rotation of the tracks 4, is so slight, that the initial kick, together with the superior weight at the rear end of the body, is ample to start the front wheels or rollers up the inclined tracks 3, whereupon the load immediately rocks the rear runways. Thus the body is moved rearwardly and tilted simultaneously; and the rear wheels violently engage the rear end of the keeper 20 at the instant the runways 4 are arrested in their movement, thus causing the desired jarring or jolting of the body.

As shown, the rockable runways are each provided with central, depending eyes or bearings 22 for connection to the ends of a continuous cross shaft 23 to which the same are rigidly keyed or otherwise secured, the said shaft rotating in bearings formed in the side members of the sub-frame 2, so that the runways are caused to rock simultaneously with each other. Vertically adjustable stops 24 are secured to the outer side faces of the sub-frame 2 in a position to be engaged by the front ends of the rockable runways when the body is in normal position, to assist in supporting the same and the load therein. Other stops 25 (Fig. 3) are preferably secured to the rear face of transverse member 26 constituting the rear end member of the chassis, said stops being also vertically adjustable for the purpose of engaging the rear ends of the rockable runways when the latter are in tilted position and limiting the angle to which the runways may tilt.

When the body rocks back to normal carrying position and the two sets of rollers engage their respective stops to arrest forward movement, a bail or keeper 27 is in exact position to be engaged by a swinging latch 28 mounted on a rock shaft 29 having opposite bearings in the sub-frame 2, said shaft being rotated by a suitable hand lever 30 located at one side of the truck. The latch, under spring pressure, has a normal tendency to move forwardly to engage the keeper automatically.

Mounted on the shaft 29 there is also an upwardly extending, curved arm 31 constituting a "kicker" arm which, when the body is in normal position, engages a roller 32 secured to the front cross bar of the frame work of the body 5 and causes an initial upward movement of the body, when the rocker shaft is actuated by the hand lever 30.

When the body 5 is gravitating to its normal position, after the load is dumped, and after the "stiff leg" has been "broken" and allowed to fold, the force of the falling body, which otherwise would cause damage to the various parts, is taken up by a buffer 33 mounted on the body preferably in advance of the keeper 27 and adapted to embrace and to rest on a suitable striker plate or member (not shown) secured to the sub-frame.

No detailed description is deemed necessary herein of the "stiff leg" device, nor of the latching or "kicking" mechanisms, or buffer, as all are fully disclosed in copending applications. The construction of the body is not described because it is not a matter of importance, so far as the present invention is concerned. The body may dump through an automatic endgate, as disclosed in pending applications of A. S. Hughes, or over the lowered end, which then will be specially shaped for the purpose.

It will be clear that while the truck body has been described as dumping to the rear, the same construction may be used if the body dumps to the front, for instance, as disclosed in certain copending applications filed by us. The words "front" and "rear" and the like are merely convenient descriptive terms, and their use in the following claims should be considered as merely a matter of convenience.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:—

1. A dumping truck comprising, in combination, a frame mounted on the chassis of the truck and a dump body arranged above the frame; front runways rigidly secured to the frame and inclined upwardly rearwardly; normally horizontal runways pivotally secured to the frame in rear of the inclined runways, the lowest points of the inclined runways being lower than the rear runways when in a horizontal position; and rollers carried by the body and bearing on the runways to support the body.

2. A dumping truck comprising, in combination, a frame carried by the chassis; an elongated dump body located above the frame; rearwardly inclined runways rigidly secured to the sides of the frame at intermediate points thereof and having upwardly curved stops at their lower, forward ends; front rollers carried by the body and mounted on the runways to abut the stops when the body is in normal position; normally horizontal, tiltable runways mounted on the sides of the frame in rear of the rigid runways; and rear rollers carried by the body and mounted on the tiltable runways.

3. A dumping truck comprising, in combination, a frame carried by the chassis; an elongated dump body located above the frame; rearwardly inclined runways rigidly secured to the sides of the frame at intermediate points thereof and having upwardly curved stops at their lower, forward ends; front rollers carried by the body and mounted on the runways to abut the stops when the body is in normal position; normally horizontal, tiltable runways mounted on the sides of the frame in rear of the rigid runways; rear rollers carried by the body and mounted on the tiltable runways; and means carried by each of the runways for holding the rollers thereon.

4. A dumping truck comprising, in combination, a frame carried by the chassis; an elongated dump body located above the frame; rearwardly inclined runways rigidly secured to the sides of the frame at intermediate points thereof and having upwardly curved stops at their lower, forward ends; front rollers carried by the body and mounted on the runways to abut the stops when the body is in normal position; normally horizontal, tiltable runways mounted on the sides of the frame in rear of the rigid runways; rear rollers carried by the body and mounted on the tiltable runways; and stops carried by the tiltable runways to abut the rear rollers to limit their movement on the runways.

5. A dumping truck comprising, in combination, a frame carried by the chassis; an elongated dump body located above the frame; rearwardly inclined runways rigidly secured to the sides of the frame at intermediate points thereof and having upwardly curved stops at their lower forward ends; front rollers carried by the body and mounted on the runways to abut the stops when the body is in normal position; normally horizontal, tiltable runways mounted on the sides of the frame in rear of the rigid runways; rear rollers carried by the body and mounted on the tiltable runways; the front and rear pairs of rollers being each mounted on a transverse axle; and rails or keepers carried by the runways and arranged above the axles to hold the rollers to the runways.

6. A dumping truck comprising, a subframe; a dump body located above the frame; front and rear rollers carried by the body, the rear rollers being normally higher than the front rollers; rearwardly inclined tracks carried by the frame to support the front rollers when the body is in normal position; normally horizontal, tiltable tracks carried by the frame to support the rear rollers; and adjustable stops carried by the frame to contact with the tiltable tracks respectively to arrest the latter in horizontal position when the body is in normal position or in inclined position when dumping, to impart a jolt or jar to the body.

7. A dumping truck comprising a subframe; a dump body located above the frame; front and rear rollers carried by the dump body; front and rear runways mounted on the frame and normally in contact with the rollers to support the body, the front rollers being normally lower than the rear rollers when the body is in normal horizontal position, said rear runways being pivoted on the frame intermediate their ends and being normally horizontal and tiltable to lower the rear rollers below their normal positions and to allow the front rollers to rise above the normal positions of the rear rollers when the body is released for dumping; the pivot axis of said rear runways being to the rear of and below the rear rollers.

8. A mounting for truck bodies comprising, in combination, two pairs of rollers secured to the body at intermediate points; a runway for each roller, two runways for the rollers being fixed to the body supporting frame, the other two runways being rockable longitudinally of the frame and being constructed and arranged to prevent lateral or upward movement of the rollers which engage them and to permit but limited longitudinal movement of the rollers; the rollers and runways being so proportioned and positioned that when the body is in load-holding position, the tiltable runways are stable, and when the body has been moved longitudinally for about half the maximum distance possible for such movement, the tiltable runways tilt under the weight of the body, precipitating the body to the extreme dumping position.

9. In combination, a body; a frame for supporting the body; two pairs of rollers secured to the body at intermediate points; one pair being to the rear of the other; a runway for each roller; the two forward runways being fixed to the body supporting frame; the other two runways being rockable in a plane longitudinal of the frame and being constructed and arranged to be tilted automatically by the body and having means engaging the rollers to prevent lateral or upward movement of the rollers and to permit but limited longitudinal movement of the rollers.

10. A dumping truck comprising, in combination, a frame; a dump body located above the frame; front and rear rollers carried by the dump body; front and rear runways mounted on the frame and normally in contact with the rollers to support the body, the front rollers being normally lower than the rear rollers when the body is in normal horizontal position, said rear runways being pivoted on the frame intermediate their ends and being normally horizontal and tiltable to lower the rear rollers below their normal positions and to allow the front rollers to rise above the normal positions of the rear rollers when the body is released for dumping; the pivot axis of said rear runways being to the rear of and below the rear rollers; and means to support the rear runways in a horizontal position when the body is in loading position, said means not interfering with the aforesaid downward tilting.

11. In combination, a body, a combined roller and runway support for the body comprising two rollers on opposite sides of the body and two runways therefor which are short relative to the body; a frame carrying the runways; the rollers each being movable along one of the runways, the two runways being rockable on fixed pivots located adjacent the rear end of the frame; means on the frame supporting the front ends of the runways when in horizontal position so as to stabilize said runways when the body is horizontal; the runways being rendered unstable and immediately tilting downwardly in the direction in which the body moves when dumping, when the body is moved longitudinally past the axis on which the runways tilt.

In testimony, that we claim the foregoing as our own, we have hereto affixed our signatures.

ARTHUR S. HUGHES.
HOWARD F. GORSUCH.